INVENTOR.
Heinz U. Marx
BY
Burke M. Halldorson
ATTORNEY

United States Patent Office 3,520,469
Patented July 14, 1970

3,520,469
TEAR TAPE
Heinz U. Marx, Parma, Ohio, assignor to The Dow Chemical Company, Midland, Mich., a corporation of Delaware
Filed Mar. 22, 1968, Ser. No. 715,413
Int. Cl. B65d 5/70; C09j 7/02
U.S. Cl. 229—51                             9 Claims

ABSTRACT OF THE DISCLOSURE

This invention relates to a tear tape particularly suited for usage on highly stretchable polyethylene film and sheet materials. The tear tape is secured to the polyethylene material by a heat activated adhesive which comprises a copolymer of ethylene and an ethylenically unsaturated carboxylic acid. The adhesive functions to diminish the stretchable qualities of polyethylene in the seal area such that a more controlled, smoother tearing action is obtained. Also, a superior bond between the film and the tear tape can be achieved such that frequently even contaminated film surfaces can be fitted with the unique tear tape construction disclosed.

DESCRIPTION OF THE INVENTION

The polyethylene family of thermoplastics have gained wide acceptance in packaging applications either when employed as overwrap materials or when fabricated into bags. In many of these applications it is desired that a convenient opening feature be included in the package design. The tough, highly stretchable qualities of polyethylene, however, pose difficult problems in the opening area. For instance, when the prior art tear tapes were fitted to these materials, the tear obtained was often of a ragged, uncontrolled nature characterized by considerable stretching and pulling apart of the material. The problem is particularly acute with low density polyethylene films, for example, those having densities in a range of from about 0.91 to about 0.93 gram per milliliter.

An example of the prior attempts to overcome the limitations of polyethylene as regards tear tapes is illustrated in some detail in U.S. Pat. No. 3,088,379. Here the solution proposed was to lay three separate tapes with the two on the outside acting as tear guide lines to direct the propagation of rupture of the polyethylene film materials. Thus, the concept was to provide ridges on each side of a centrally located tear tape such that tearing could be directed along a desired path, that is, between the two outside tapes. Economics, of course, is always a problem with opening devices as sophisticated as that described above.

Another problem experienced when using polyethylene packaging materials is frequently deterioration of their sealing qualities upon minor contamination with printing ink. In the printing art it is common to first coat the polyethylene with an overlacquer to provide a suitable surface for receiving printed legends. While the overlacquer is usually applied to a specific boundary on the film, leaving uncoated areas where sealing is desired, it is not uncommon for the uncoated areas to become slightly contaminated with the overlacquer substance. Small amounts of this sort of contamination have been found sufficient in the past to prevent proper bonding between the tear tape and the polyethylene material.

Accordingly, it is an object of the present invention to provide an improved tear tape adapted for use with polyethylene thermoplastic materials wherein the tear tape can be adhered to the polyethylene even though it may be contaminated with a printing ink overlacquer and specifically those overlacquers classified as polyamides.

Another object of the present invention is to provide a tear tape particularly suited to polyethylene materials wherein the adhesive securing the tear tape to the polyethylene alters the physical characteristics thereof such that a smoother, more uniform tearing action results.

It is still a further object of the present invention to provide a tear tape for low density polyethylene packaging materials which effects the physical characteristics of the polyethylene at the seal such that a more controlled and smoother tear opening can be obtained.

Briefly then, the present invention contemplates an improved tear tape directed for use on polyethylene films, sheets and like materials, and particularly those classified as low density polyethylene materials. Essentially, the tear tape comprises a two-ply structure with one of the plies being Mylar® [(poly(ethylene terephthalate)], nylon, polypropylene or like materials having the tensile toughness and low stretchable qualities necessary for tear tape purposes. The second ply is an adhesive layer comprising a copolymer of ethylene and an ethylenically unsaturated carboxylic acid, as, for example, acrylic acid. Bonding is achieved by placing the adhesive side of the tape against the polyethylene and then sealing the tape thereto by application of pressure and heat. During the bonding step it is believed that the copolymer adhesive intermixes with the polyethylene through interdiffusion. In any event, there is noticed a significant diminishing of the usually highly stretchable quality of the polyethylene in the seal area such that a superior, more controlled tearing action can be achieved. Furthermore, these tear tapes have been found able to seal to polyethylene surfaces even when they are contaminated with small amounts of printing ink, particularly the polyamide based inks.

Other objects and advantages of the present invention and its details of construction will be apparent from a consideration of the following specification and accompanying drawings wherein.

Figure 1:
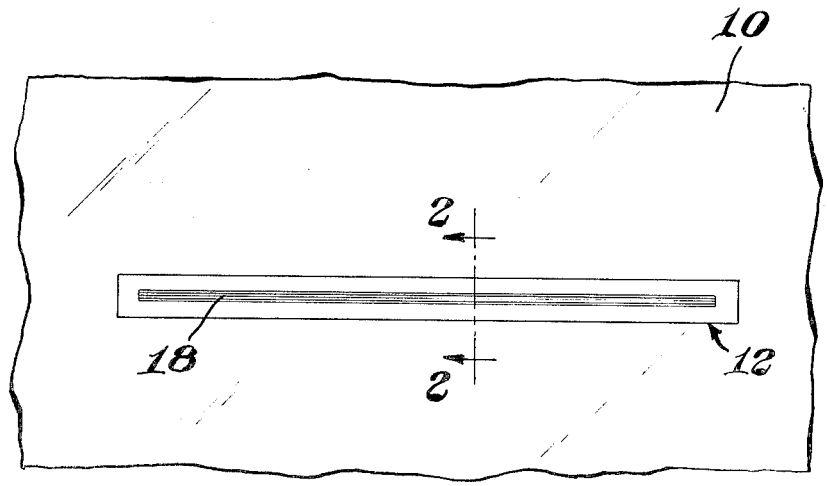
FIG. 1 illustrates a fragmentary top view of a web of polyethylene material having affixed thereto a tear tape constructed in accordance with the principles of the present invention.
Figure 2:
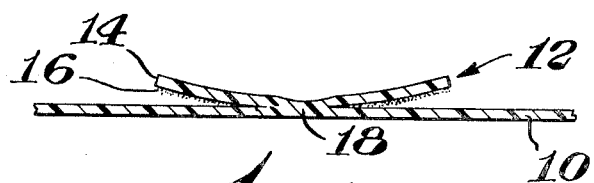
FIG. 2 is a cross-section of the tear tape construction of FIG. 1 taken along line 2—2.

Referring more particularly to the drawings there is shown in FIG. 1 a section of polyethylene material 10 having affixed thereto a tear tape 12. The polyethylene material 10 can be any of those polyethylene compositions frequently employed in the packaging of articles but is specifically described herein as being a low density polyethylene material having a density value in the range of from about 0.91 to about 0.93. The section 10 of polyethylene material illustrated can represent a portion of an overwrap of the kind frequently used in packaging cigarette cartons and the like or can represent a wall of a bag structure to which the tear tape 12 is applied.

The tear 12 illustrated is of a two-ply construction including a first or substrate layer 14 of Mylar®, polypropylene, nylon or like materials of the kind frequently selected for tear tape constructions. Essentially, the function of layer 14 is to provide a tensilely tough strip of material which upon pulling has sufficient strength to rupture the polyethylene material 12 without failing itself.

Tear tape 12 additionally includes a heat activated adhesive layer or coating 16 located between the first layer 14 and the polyethylene section 10 and securely fixing these two elements to each other along the extent of seal 18. The adhesive 16 provides sufficient bonding strength such that when the tear tape 12 is pulled from the polyethylene 10, a rupturing of the polyethylene will result. In other words, the adhesion between tape 12 and the polyethylene material 10 is greater than the cohesion of the polyethylene material itself.

The adhesive layer 16 comprises a copolymer of ethylene and an $\alpha,\beta$-ethylenically unsaturated carboxylic acid. Such copolymers are well known to the art and are commonly employed as adhesives between thermoplastics, paper, glass and the like. Thus, extensive teaching on their makeup and uses can be found in U.S. Pat. Nos. 3,264,672 and 2,970,129. Pat. No. 3,264,672 teaches random copolymers of these materials while U.S. Pat. No. 2,970,129 illustrates those classified as graft copolymers. These copolymers can be made in accordance with the teachings of U.S. Pat. No. 2,970,129 and Canadian Pat. No. 655,298.

Specifically, adhesive layer 16 can comprise copolymers of ethylene and the following acids: acrylic acid, methacrylic acid, crotonic acid, fumaric acid, maleic acid, itaconic acid and the ethyl and methyl hydrogen maleates and fumarates. For example only, the above copolymers of ethylene having a melt flow of about 12, as determined by ASTM-D-1238-57T—Condition E, would be satisfactory.

It was found that copolymers of the kind described above have certain characteristics heretofore unknown that render them especially suited for use in tear tape constructions. Specifically, when heat and pressure are applied to fuse tape 12 to the polyethylene material 10, an altering of the physical characteristics of the polyethylene by the adhesive layer 16 can be obtained. The most noticeable change, especially in the low density polyethylenes, is what could generally be referred to as an embrittlement or a decrease in stretchability. This is thought to result from intermixture of the copolymer adhesive and the polyethylene material through interdiffusion of these two materials. While not completely understood, it is known that this results in a desirable increasing of the modulus of elasticity of the polyethylene located in the seal 18 area. Thus, while in the past, considerable stretching and uneven tearing of polyethylene film and sheet materials has been the experience in the tear tape opening arts, this undesirable quality has been substantially overcome. Accordingly, a smooth, more controlled tearing can now be obtained by employing tear tapes constructed according to the principles of this invention.

Tear tape 10 can comprise a substrate layer 14 of .0005 mil Mylar® and an adhesive layer 16 of ethylene acrylic acid. An acrylic acid component in the range of about 3.5 percent by weight is preferred. Acrylic acid components in excess of 10 percent have yet to be approved by the Federal Drug Administration for packaging purposes. However, as far as operability is concerned, the acrylic acid component can range considerably higher than 3.5 percent and as high or even higher than 10 percent. However, with acrylic acid component in these more highly concentrated ranges, corrosion of the equipment extruding the ethylene acrylic acid copolymer can become a problem.

As a specific example, the above copolymer of ethylene acrylic acid can comprise 3.5 percent acrylic acid with the copolymer having a melt flow of about 12 to about 12.5 as determined by ASTM-D-1238-57T—Condition E. Usually a suitable oxidizing inhibitor such as Ionol® (2,6-ditertiarybutyl-4-methylphenol) and Santonox® [4,4'-thiobis-(3-methyl-6-tertiarybutylphenol)] is added to the copolymer. The Ionol® or Santonox® can comprise 500 parts per million of the copolymer composition. The tear tape can be applied to the polyethylene web by placing the adhesive side of the tape against the polyethylene material 10 and then applying heat and pressure to activate the adhesive layer 16 to form the desired bond. For the ethylene acrylic copolymer described, suitable results can be obtained at a bonding temperature of 350° F. with the pressure component being about 40 pounds per square inch and with the dwell time set at about ½ second. These values were arrived at when securing tear tape 12 to a 3 mil low density polyethylene bag, the surface of which was contaminated by a polyamide overlacquer substance. The width of the seal 18 measured about 1/16 of an inch.

Figure 3:
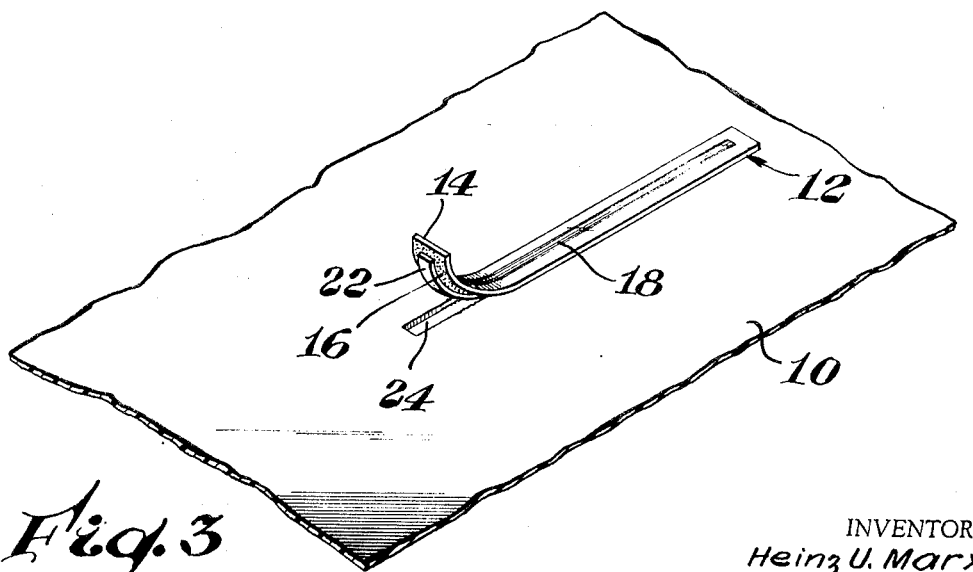
FIG. 3 is an isometric view of the tear tape of FIG. 1 showing it partially activated and a portion of the polyethylene material torn open.

FIG. 3 illustrates the tearing results that can be obtained by applying a Mylar® and ethylene acrylic acid copolymer tear tape 12 to a 3 mil low density polyethylene film 10. As observed, a strip 22 of the polyethylene 10 is removed with the actuated tape 12 leaving a tear opening 24. The opening 24 proves exceptionally clean and at places even resembles in quality the type of tearing action obtained in the more brittle films, as, for example, cellophane films.

The term polyethylene as used herein denotes the wide range of both pure and modified forms of polyethylene, that is, ethylene homopolymers or copolymers modified with suitable substances to obtain specific properties as, for example, improved slip or blocking properties.

While certain representative embodiments and details have been shown for the purpose of illustrating the invention, it will be apparent to those skilled in the art that various changes and modifications can be made therein without departing from the spirit and scope of the invention.

I claim:

1. A tear tape in combination with polyethylene material, said tear tape including an adhesive layer comprising a copolymer of ethylene and an $\alpha,\beta$ ethylenically unsaturated carboxylic acid, said adhesive layer sealed to said polyethylene material, the modulus of elasticity of the polyethylene material increased at the location of said seal, said seal providing greater adhesion between said tear tape and said polyethylene material than the cohesion of said polyethylene, said tear tape being of sufficient strength to rupture said polyethylene without failure of said tear tape.

2. A tear tape sealed together with polyethylene material by an adhesive layer comprising a copolymer of ethylene and an $\alpha,\beta$ ethylenically unsaturated carboxylic acid, said adhesive layer altering the properties of the polyethylene material located in the seal region such that a more controlled tearing action can be obtained upon activating said tear tape, said seal and said tear tape being of sufficient strength to tear open said polyethylene material upon pulling said tear tape therefrom and without failure of the tear tape.

3. The tear tape of claim 1 wherein said adhesive comprises a copolymer of ethylene and acrylic acid.

4. The tear tape of claim 1 wherein said adhesive layer comprises a copolymer of ethylene and methacrylic acid.

5. The tear tape of claim 2 wherein said adhesive comprises a copolymer of ethylene and acrylic acid.

6. The tear tape of claim 2 wherein said adhesive layer comprises a copolymer of ethylene and methacrylic acid.

7. The tear tape of claim 2 wherein said adhesive layer comprises a copolymer of ethylene and crotonic acid.

8. The tear tape of claim 2 wherein said adhesive layer comprises a copolymer of ethylene and itaconic acid.

9. The tear tape of claim 2 wherein said polyethylene material comprises a low density polyethylene having a density of between about 0.91 and 0.93 gram per milliliter.

References Cited
UNITED STATES PATENTS

| | | |
|---|---|---|
| 2,554,160 | 4/1951 | Von Gunten. |
| 2,554,841 | 4/1951 | Rumsey. |
| 2,653,744 | 9/1953 | Behr. |
| 3,098,601 | 7/1963 | Anderson et al. |
| 3,311,032 | 3/1967 | Lucas. |
| 3,391,851 | 7/1968 | Nemec. |
| 3,396,900 | 8/1968 | Lucas. |
| 3,389,016 | 6/1968 | Holtz et al. |

DAVIS T. MOORHEAD, Primary Examiner

U.S. Cl. X.R.

117—122; 161—406; 206—65